United States Patent [19]
Krauss

[11] Patent Number: 5,291,213
[45] Date of Patent: Mar. 1, 1994

[54] PEN-TYPE COMPUTER INPUT DEVICE WITH MULTIPLE SPHERES

[76] Inventor: Kenneth W. Krauss, 19308 N.E. 25 Avenue #193, Aventura, Fla. 33180

[21] Appl. No.: 995,087

[22] Filed: Dec. 23, 1992

[51] Int. Cl.[5] ............................................. G09G 3/02
[52] U.S. Cl. ..................................... 345/179; 345/164
[58] Field of Search ............... 340/706, 709, 707, 710, 340/712; 178/18, 19; 74/471

[56] References Cited

U.S. PATENT DOCUMENTS

| | | | |
|---|---|---|---|
| 3,376,551 | 5/1964 | Armbruster | 340/706 |
| 4,562,347 | 12/1985 | Hovey et al. | 340/710 |
| 4,853,630 | 8/1989 | Houston | 340/709 |
| 5,027,115 | 6/1991 | Sato et al. | 340/707 |
| 5,115,227 | 5/1992 | Keiji | 340/710 |
| 5,210,405 | 5/1993 | Toyoda et al. | 340/710 |
| 5,214,428 | 5/1993 | Allen | 340/706 |

FOREIGN PATENT DOCUMENTS

| | | | |
|---|---|---|---|
| 476276A | 3/1992 | European Pat. Off. | 340/707 |
| 0111524 | 6/1984 | Japan | 340/710 |
| 8604704 | 8/1986 | PCT Int'l Appl. | 340/707 |

*Primary Examiner*—Ulysses Weldon
*Assistant Examiner*—Lun-Yi Lao
*Attorney, Agent, or Firm*—Alvin S. Blum

[57] ABSTRACT

A pen-type computer input device operates in the same fashion as a mouse with the added advantage that the device has the features of a ball point pen having a narrow tip, with a small diameter ballpoint for tracing fine detail. The point may optionally deposit ink on the path traversed. The device has an elongate housing which may be grasped like a pen. A stack of contiguous spheres rotatably mounted within the housing serially transmits motion of the lowermost tip sphere to the uppermost sphere which operates as a mouse ball to provide computer signal input directly related to motion of the pen tip. The device may incorporate a mouse at the top or be adapted for retrofit to an existing mouse.

18 Claims, 1 Drawing Sheet

PEN-TYPE COMPUTER INPUT DEVICE WITH MULTIPLE SPHERES

BACKGROUND OF THE INVENTION

1. Field of the Invention

The present invention relates to a pen-type computer input device for moving a cursor on the display of a computer system or entering data such as figures, letters, numerals, or the like into a computer system, and more particularly to one which utilizes multiple movable spheres in series.

2. Background Art

There are many types of computer input devices such as a keyboard, a digitizer, a tablet, a mouse, a light pen, etc. which are used in the art of computers. A mouse is a device for relatively moving a cursor displayed on a video monitor. The mouse, and the other conventional computer input devices are difficult to move accurately over small distances because of the size and structure, making it very difficult to enter small letters, symbols, numerals, figures, etc.

The exception being digitizer tablets with pen-like writing instruments, a fiber optical pen type mouse, and an electronic pen-type computer input device which all incorporate electronic means, at least in part, to relay the writing input produced by a pen-like writing instrument in relative real time. These new and conventional computer devices can not be attached to existing widely used mouses to most efficiently increase computer systems' capabilities. Furthermore, these devices can not be used for simultaneously producing a hard copy of the path of the pen because they do not deposit ink on the surface traversed.

SUMMARY OF THE INVENTION

In the preferred embodiment of a pen-type extension/attachment for a mouse (computer input device), it is an object of the present invention to provide a small in size, mechanical device, easily handled like a pen, which can enter and transfer letters, symbols, numerals, figures, etc. and control a cursor through a mouse (computer input device) which is connected to a computer system as well as being capable of delivering ink to the writing surface in a ball point pen-like delivery method. Furthermore, it is an object of the present invention to relay the motion of pressure exerted on the writing instrument's tip when in contact with a writing surface. It is another object that the tip have a small diameter ball for precisely following small patterns.

To achieve the above objects, there is provided a pen-type extension, attachment for a computer mouse comprising a housing having a tip end and an end with attachment means, such as clips for attaching a mouse. Within the housing is a row of hollow or solid balls in uniform or varying sizes. The balls' surfaces are of a material or structure, (male, female, abrasive, jagged or sticky-like, silicone, rubber or plastic, etc.) so as to assure that they respond and interact with each other in a gear-like fashion, one after the other down the line serially, so as to transfer or relay the movement (the "Rotation", directions and distance) from the first small ball in the tip of the housing to the last ball in the housing. The housing may rotatably support one or more of the balls of individual rotatable supports may be used. The housing is designed so as to allow the final ball within it to contact with an attached (inside or outside of housing) computer mouse ball's surface, so that the two balls respond and interact with each other to facilitate a relatively smooth transference of motion. The final ball in the housing must be composed of a material or structure so as to assure that it interacts with an attached mouse ball's surface. Alternatively the uppermost ball in the series may be arranged to function as the ball of a conventional mouse by means well known in the art. Furthermore, pressure exerted on the initial contact ball in the tip end of the device may be sensed and relayed to the computer by means well known in the art. Ink may optionally be delivered to the writing surface by the rotatably supported ball in its tip, like a ball point pen. Ink can be refilled through a resealable opening in the ink compartment portion of the housing's wall.

These and other objects, features and advantages of the invention will become more apparent from the following description in conjunction with the accompanying drawing.

DESCRIPTION OF THE PREFERRED EMBODIMENTS OF THE INVENTION

Figure 1:
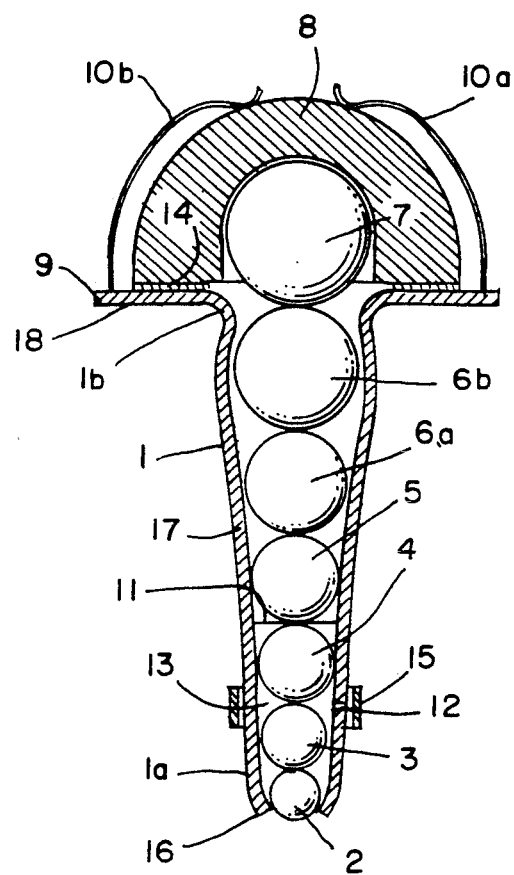
FIG. 1 is a simplified cross-sectional view of a preferred embodiment of the invention.

Referring now to FIG. 1, the preferred embodiment of the input device comprises an elongate housing 1 with a narrow tip portion 16, an intermediate portion 17 adapted to be gripped by the hand, and an uppermost end portion 18. The housing 1 encloses a stack of contiguous spheres 2, 3, 4, 5, 6a, 6b arranged one atop the other and rotatably held within the housing by supports 1a, 1b. A portion of the lowermost sphere 2 extends below the tip 1a of the housing in the manner of a ball-point pen and the sphere 2 and tip 1a have a small diameter to facilitate tracing fine details on a surface. The spheres are rotatably mounted within the housing so as to have sufficient contact with adjacent spheres to cause a serial transfer of motion along the stack of spheres. This chain reaction of motion causes motion of the lowermost sphere due to movement across a surface to be faithfully transmitting along the stack of spheres to the uppermost sphere 6b.

A conventional computer input device 8, of the mouse type well known in the art is mounted on the housing seat 9 by spring clips 10a, 10b. The ball 7 of the mouse 8 is in intimate rolling contact with the uppermost sphere 6b so that motion is transmitted therebetween. Motion of the lowermost sphere 2 is thereby converted to electrical signal information through the mouse electronic mechanism which is well known in the art and need not be described herein. The mouse 8 may be incorporated into the manufacture of the device of the invention. Alternatively, the uppermost portion of the housing may be arranged to retrofit onto a mouse of other manufacture.

The housing may optionally be provided with an ink space 13 accessed by an ink filling aperture 12 with a cover 15. The tip sphere 2 then writes like a ball point pen providing a hard copy of the pen path as well as electronic input of the pen path into the computer.

An ink seal 11 may optionally be provided to prevent upward movement of the ink. The sphere surfaces may interdigitate, male/female, gear-like, or be provided with other surface features which enhance motion transfer such as tacky or abrasive surfaces and the like.

The housing 1 may be rigid or flexible, formed in one piece, or in connected segments, as desired, by means well known in the art.

By means of flexible housing supports, pressure exerted on the lowermost sphere 2 may be transmitted to a pressure sensor or transducer 14 to provide additional signal information input to the computer.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A data input device comprising:
   an elongate housing having a narrow lower tip end, an intermediate portion and an upper end portion, said intermediate portion arranged for grasping by the hand of a user;
   three or more spheres rotatably mounted within said housing with each sphere contiguous with at least one other sphere, with a lowermost of said spheres partially extending below said lower tip for providing a rolling contact with a surface, said spheres arranged for serially driving one another, whereby motion imparted by rolling the lowermost sphere on said surface is transmitted serially through said spheres to an uppermost of said spheres.

2. The input device according to claim 1, in which said housing further comprises attachment means at said upper end portion, said attachment means arranged for connecting to a rolling ball computer input apparatus of the mouse type with said uppermost sphere rotatably driving the rolling ball of said rolling ball computer input device.

3. The device according to claim 2, further comprising an ink reservoir within said housing arranged to feed ink to said lowermost sphere for writing upon a surface.

4. The device according to claim 2, further comprising sensor means providing a signal responsive to pressure of said lowermost sphere on said surface, said sensor means connected to said housing.

5. The device according to claim 1, in which the upper end of the housing is provided with signal means, whereby said uppermost sphere is arranged to function as the rolling ball of a mouse-type computer input apparatus to provide electronic signals reflecting motion of said lowermost sphere on a surface.

6. The device according to claim 5, further comprising an ink reservoir within said housing arranged to feed ink to said lowermost sphere for writing upon a surface.

7. The device according to claim 5, further comprising sensor means providing a signal responsive to pressure of said lowermost sphere on said surface, said sensor means connected to said housing.

8. The device according to claim 1, further comprising an ink reservoir within said housing arranged to feed ink to said lowermost sphere for writing upon a surface.

9. The device according to claim 1, further comprising sensor means providing a signal responsive to pressure of said lowermost sphere on said surface, said sensor means connected to said housing.

10. A data input device comprising:
    an elongate housing having a narrow lower tip end, an intermediate portion and an upper end portion, said intermediate portion arranged for grasping by the hand of a user;
    four or more spheres rotatably mounted within said housing with each sphere contiguous with at least one other sphere, with a lowermost of said spheres partially extending below said lower tip for providing a rolling contact with a surface, said spheres arranged for serially driving one another, whereby motion imparted by rolling the lowermost sphere on said surface is transmitted serially through said spheres to an uppermost of said spheres.

11. The input device according to claim 10, in which said housing further comprises attachment means at said upper end portion, said attachment means arranged for connecting to a rolling ball computer input apparatus of the mouse type with said uppermost sphere rotatably driving the rolling ball of said rolling ball computer input device.

12. The device according to claim 11, further comprising an ink reservoir within said housing arranged to feed ink to said lowermost sphere for writing upon a surface.

13. The device according to claim 11, further comprising sensor means providing a signal responsive to pressure of said lowermost sphere on said surface, said sensor means connected to said housing.

14. The device according to claim 10, in which the upper end of the housing is provided with signal means, whereby said uppermost sphere is arranged to function as the rolling ball of a mouse-type computer input apparatus to provide electronic signals reflecting motion of said lowermost sphere on a surface.

15. The device according to claim 14, further comprising an ink reservoir within said housing arranged to feed ink to said lowermost sphere for writing upon a surface.

16. The device according to claim 14, further comprising sensor means providing a signal responsive to pressure of said lowermost sphere on said surface, said sensor means connected to said housing.

17. The device according to claim 16, further comprising an ink reservoir within said housing arranged to feed ink to said lowermost sphere for writing upon a surface.

18. The device according to claim 10, further comprising sensor means providing a signal responsive to pressure of said lowermost sphere on said surface, said sensor means connected to said housing.

* * * * *